United States Patent
Phillippi et al.

(10) Patent No.: US 11,472,671 B2
(45) Date of Patent: Oct. 18, 2022

(54) INSPECTION ASSEMBLY FOR ELEVATOR SYSTEM

(71) Applicant: Otis Elevator Company, Farmington, CT (US)

(72) Inventors: Scott Phillippi, Florence, SC (US); Kiron Bhaskar, Farmington, CT (US); Joseph Crute, Cromwell, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 397 days.

(21) Appl. No.: 16/676,892

(22) Filed: Nov. 7, 2019

(65) Prior Publication Data
US 2021/0139281 A1   May 13, 2021

(51) Int. Cl.
| | |
|---|---|
| G01M 5/00 | (2006.01) |
| B66B 5/00 | (2006.01) |
| B66B 7/04 | (2006.01) |
| B66B 7/12 | (2006.01) |

(52) U.S. Cl.
CPC ......... B66B 7/1246 (2013.01); G01M 5/0025 (2013.01)

(58) Field of Classification Search
CPC combination set(s) only.
See application file for complete search history.

(56) References Cited

U.S. PATENT DOCUMENTS

| | | | | |
|---|---|---|---|---|
| 9,457,989 | B2* | 10/2016 | Meierhans | B66B 5/20 |
| 2013/0248298 | A1* | 9/2013 | Osmanbasic | B66B 5/20 |
| | | | | 187/359 |
| 2019/0225287 | A1 | 7/2019 | Zhou et al. | |

FOREIGN PATENT DOCUMENTS

| | | | | |
|---|---|---|---|---|
| CN | 1499172 | A | 5/2004 | |
| CN | 1587905 | A | 3/2005 | |
| CN | 1292229 | C * | 12/2006 | B66B 7/1246 |
| CN | 104976982 | A | 10/2015 | |
| CN | 107144260 | A | 9/2017 | |
| CN | 110371816 | A | 10/2019 | |
| JP | 1160104 | A | 3/1999 | |
| JP | 2016155658 | A | 9/2016 | |

OTHER PUBLICATIONS

Office Action for Chinese Application No. 202011229552.1, dated Feb. 11, 2022.

* cited by examiner

*Primary Examiner* — Brandi N Hopkins
(74) *Attorney, Agent, or Firm* — Cantor Colburn LLP (57) ABSTRACT

Disclosed is an assembly having: at least one drive wheel configured to roll against a hoistway rail of an elevator system; and a drive mechanism supported by the assembly and configured to drive the at least one of drive wheel, wherein the assembly is configured to support one or more sensors.

18 Claims, 5 Drawing Sheets

INSPECTION ASSEMBLY FOR ELEVATOR SYSTEM

BACKGROUND

The embodiments herein relate to elevator inspection implements and more specifically to an inspection assembly for an elevator system.

Elevator systems typically include various components including a cab for carrying passengers between landings at various levels of a building, a counterweight, a rope or belt, a drive mechanism, a series of sheaves operate to move the belt, cab and counterweight within a hoistway to achieve the desired elevator operation.

It is necessary to monitor the condition of elevator systems. The nature of an elevator system, including the complexity and wear characteristics of the components during the life of the elevator system, makes it necessary to periodically evaluate the condition of the components. Visual inspection of elevator components may present a challenge due to tight space clearances, hoistway lighting, component sizing and distribution around the cab.

BRIEF SUMMARY

Disclosed is an assembly comprising: at least one drive wheel configured to roll against a hoistway rail of an elevator system; and a drive mechanism supported by the assembly and configured to drive the at least one of drive wheel, wherein the assembly is configured to support one or more sensors.

In addition to one or more of the above disclosed aspects or as an alternate the at least one drive wheel comprises a plurality of drive wheels configured to roll against respective ones of a plurality of side surfaces of the hoistway rail.

In addition to one or more of the above disclosed aspects or as an alternate a wheel biasing member biases the plurality of drive wheels toward one another to provide a pinch load against the hoistway rail when positioned against the hoistway rail.

In addition to one or more of the above disclosed aspects or as an alternate the wheel biasing member is a spring or an actuator.

In addition to one or more of the above disclosed aspects or as an alternate, the assembly includes a plurality of drive-wheel tracks that converge toward one end of the assembly, and the plurality of drive wheels move toward the one end of the assembly in the plurality of drive-wheel tracks responsive to the wheel biasing member biasing the drive wheels toward one another, thereby increasing pressure against the hoistway rail.

In addition to one or more of the above disclosed aspects or as an alternate, the assembly includes a guide implement configured to maintain an orientation of the assembly along the hoistway rail.

In addition to one or more of the above disclosed aspects or as an alternate the guide implement includes an alignment-biasing member configured to apply a biasing force that urges the assembly toward the hoistway rail, thereby maintaining the orientation of the assembly against the hoistway rail.

In addition to one or more of the above disclosed aspects or as an alternate the alignment-biasing member implement includes one or more magnets configured to apply a biasing force that urges the assembly toward the hoistway rail, thereby maintaining the orientation of the assembly against the hoistway rail.

In addition to one or more of the above disclosed aspects or as an alternate the one or more magnets are a plurality of magnets spaced along a height of the assembly.

In addition to one or more of the above disclosed aspects or as an alternate, the assembly includes a magnet carrier that is movable by an actuator to move the plurality of magnets.

In addition to one or more of the above disclosed aspects or as an alternate the guide implement includes one or more guide wheels configured to roll against the hoistway rail when the assembly is disposed against the hoistway rail.

In addition to one or more of the above disclosed aspects or as an alternate the guide implement includes one or more guide slides that are configured to slide against the hoistway rail.

In addition to one or more of the above disclosed aspects or as an alternate the one or more guide slides includes a plurality of guide slides that are configured to slide against respective ones of the plurality of side surfaces of the hoistway rail.

In addition to one or more of the above disclosed aspects or as an alternate the assembly includes a plurality of guide-slide tracks, and the plurality of guide slides are configured to move along respective ones of the plurality of guide-slide tracks, thereby positioning the plurality of guide slides closer to or further from one another.

In addition to one or more of the above disclosed aspects or as an alternate the one or more sensors includes one or more of a cameras, 3D scanners, audio monitoring equipment, and vibration monitoring equipment.

In addition to one or more of the above disclosed aspects or as an alternate the assembly includes a body that defines an L-bracket; and when the assembly is positioned on the hoistway rail: the one end of the body is a vertical top of the body and the other end of the body is a vertical bottom of the body; one member of the L-bracket is vertical, and another member of the L-bracket is horizontal; and the one or more of drive-wheels are rotationally connected to the one member and the one or more sensors is mounted to the other member.

Further disclosed is an elevator system including a hoistway rail and an assembly having one or more of the above disclosed aspects, the assembly being disposed against the hoistway rail.

Further disclosed is a method of inspecting a hoistway rail, comprising: positioning an assembly against the hoistway rail; biasing at least one drive wheel against the hoistway rail to increase friction between the least one drive wheel and the hoistway rail; driving the at least one drive wheel to move the assembly along the hoistway rail; and communicating with one or more sensors supported by the assembly.

In addition to one or more of the above disclosed aspects or as an alternate, the method includes moving one or more magnets of a guide implement toward the hoistway rail for orienting the assembly against the hoistway rail.

In addition to one or more of the above disclosed aspects or as an alternate, the method includes manipulating one or more guide slides of the guide implement for orienting the assembly against the hoistway rail.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
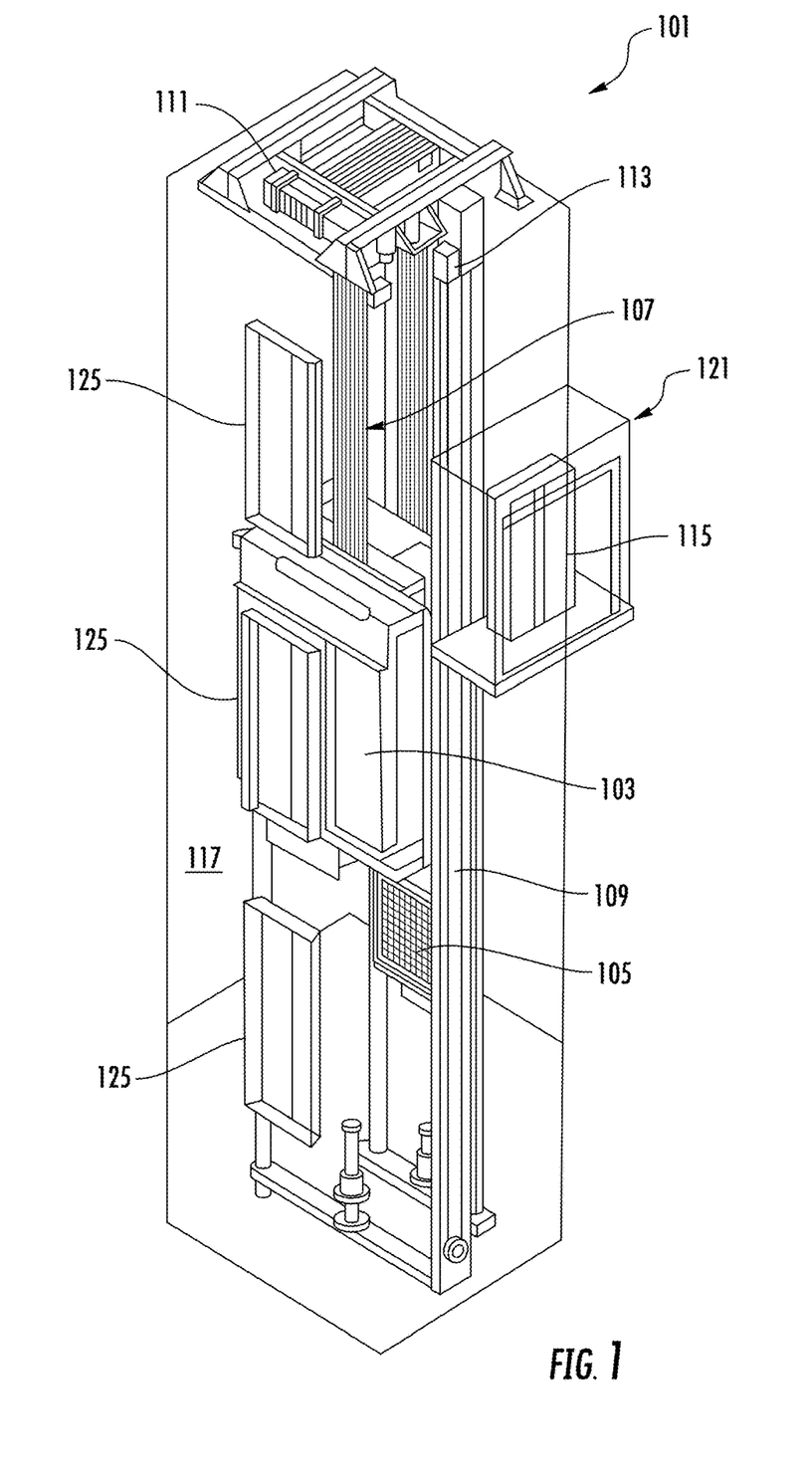
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft or hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Inspections of the hoistway are required to properly maintain the elevator system. However, such inspections may require an operator to ride atop of an elevator cab or stay in an elevator pit, which may be time consuming and pose other challenges. In addition, in such conditions, lighting in a hoistway may limit an ability for an operator to properly inspect the hoistway.

Figure 2:
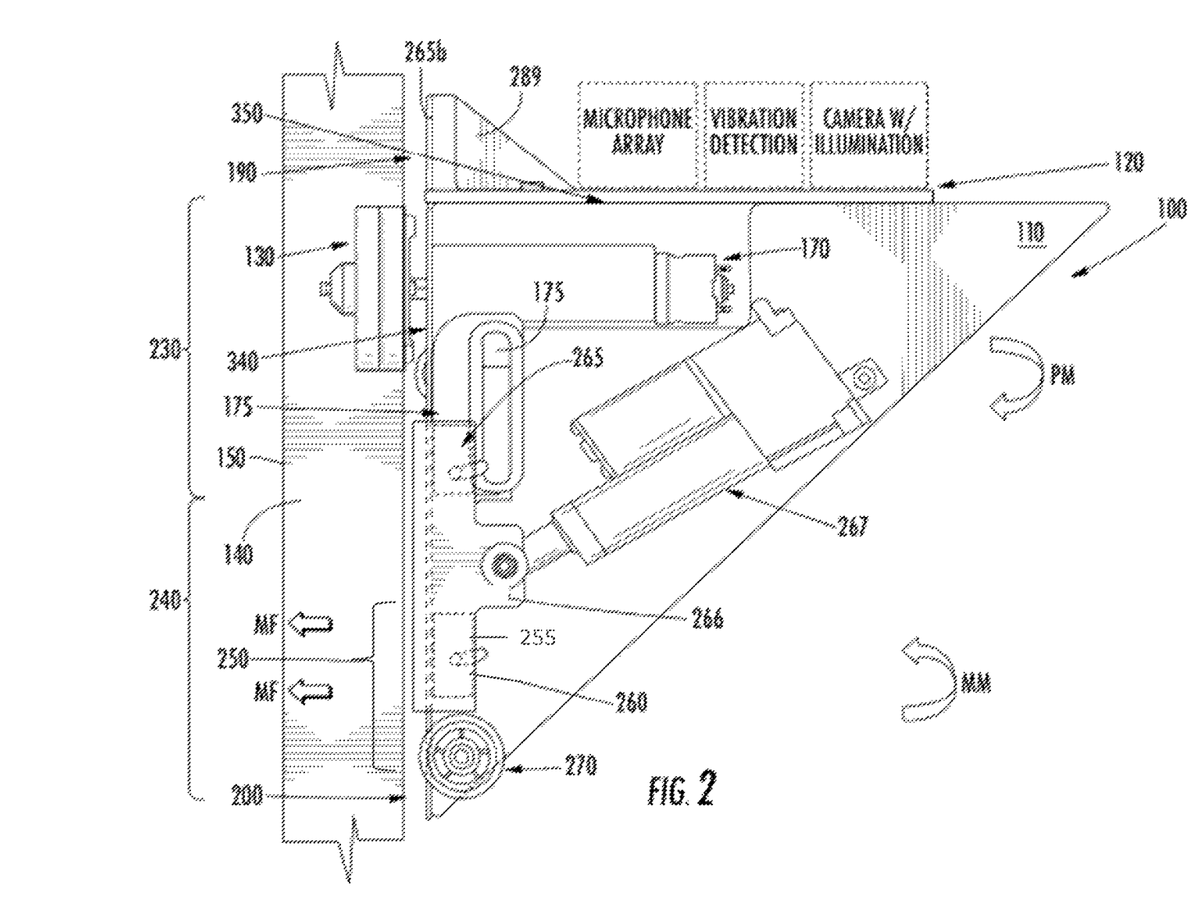
FIG. 2 is a side view of an inspection assembly according to a disclosed embodiment.
Figure 3:
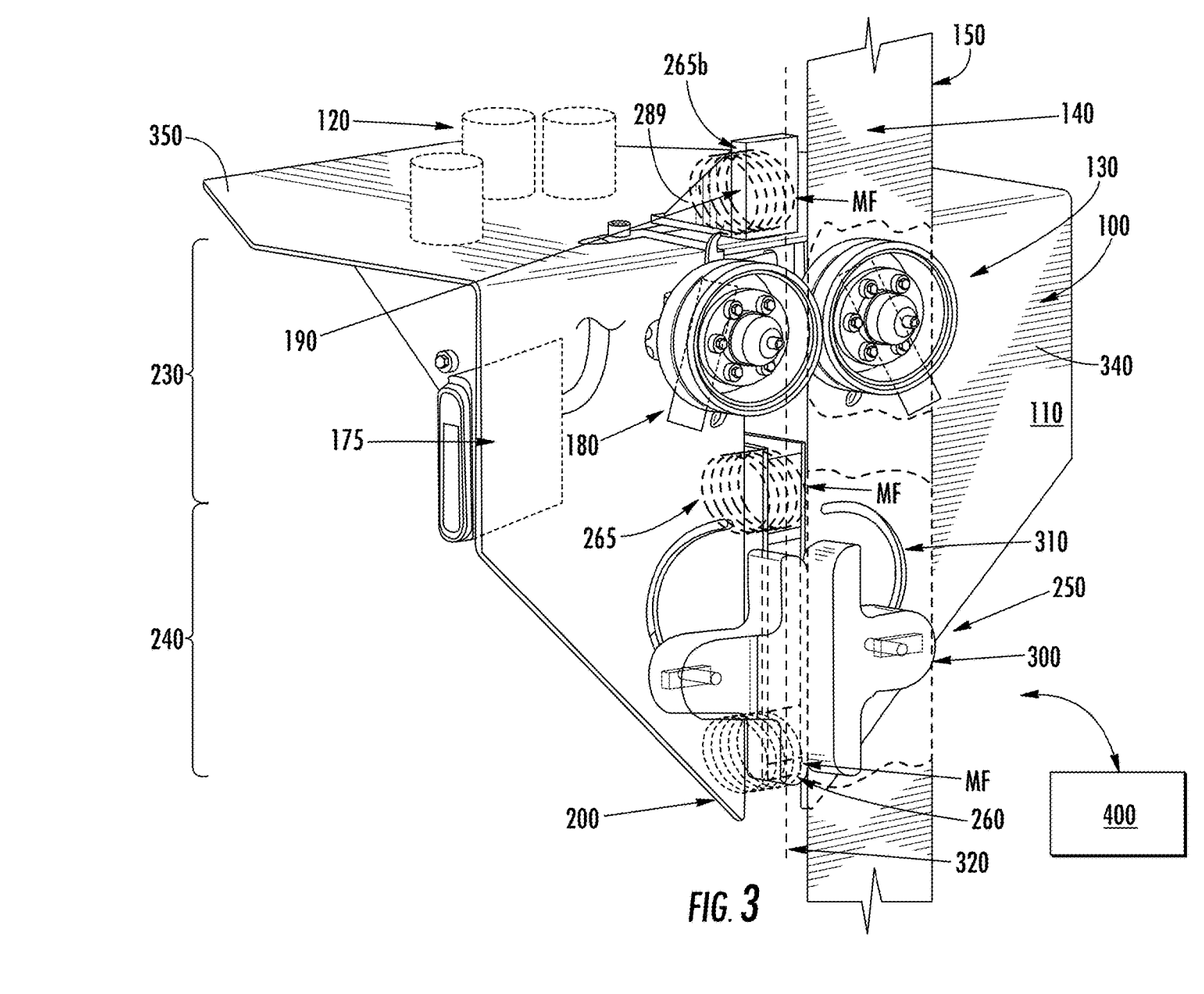
FIG. 3 is a front perspective view of the inspection assembly of FIG. 2.

In view of the above identified concerns, turning to FIGS. 2-3, an inspection vehicle or assembly (assembly) 100 is illustrated for inspecting a hoistway rail. The assembly 100 includes a body 110 configured to support one or more sensors 120. The one or more sensors 120 are one or more of a microphone array, a vibration detector (e.g., accelerometer), temperature sensor, measuring device (e.g., laser range finder, radar, etc.) and a camera (e.g., video, 2D, 3D, thermal, infrared, etc.). The sensors may include a controllable light source.

At least one drive wheel 130a (FIG. 3) is supported by the body 110. In one embodiment the at least one drive wheel 130a includes a plurality of drive wheels 130 configured to roll against respective ones of a plurality of side surfaces 140 of a hoistway rail 150 (partially illustrated in FIG. 3). As indicated, while the disclosure references a plurality of drive wheels 130, embodiments with one drive wheel 130a are within the scope of the disclosure. The hoistway rail 150 of FIGS. 2-3 may the same as the guide rail 109 of the elevator system 101 of FIG. 1. A drive mechanism 170 is supported by the body 110. The drive mechanism 170 is configured to drive one or any desired number of drive wheels 130. In one embodiment, there may be two, three, or even more drive wheels 130.

The drive mechanism 170 is configured to receive operational instructions, either by wired or wireless communications. The drive mechanism 170 may be a drive-wheel motor. A power supply 175 may be mounted to the body 110. The power supply 175 may comprise one or more batteries, which may be disposable or rechargeable. In addition, power may be provided through a wired connection.

The body 110 includes a plurality of drive-wheel tracks 180 (FIG. 4) that converge toward one end 190 of the body 110 and diverge toward another end 200 of the body 110. Regarding the plurality of drive wheels 110, moveable tracks or a belt to provide a vertical drive force are within the scope of the disclosure. The plurality of drive wheels 130 synchronously move along respective ones of the plurality of drive-wheel tracks 180. Movement of the plurality of drive wheels 130 toward the one end 190 of the body 110 positions the plurality of drive wheels 130 closer to one another to increase pressure against the hoistway rail 150. A wheel biasing member 210 extends between the plurality of drive wheels 130. The wheel biasing member 210 biases the plurality of drive wheels 130 toward one another. This moves the plurality of drive wheels 130 in the plurality of drive-wheel tracks 180 toward the one end of the body 110. As a result, the plurality of drive wheels 130 are positioned closer to one another. The wheel biasing member 210 may be a drive-wheel actuator supported by the body 110, which may be wirelessly controlled. In various embodiments pressuring the plurality of drive wheels 130 against the hoistway rail 150 may be accomplished by one or more springs, pneumatics, hydraulics, a linear actuator, and the like.

The body 110 includes a first portion that is an upper portion 230 when the assembly 100 is arranged on a hoistway rail 150, and a second portion that is a lower portion 240 when the assembly 100 is arranged on a hoistway rail 150. The plurality of drive wheels 130 are disposed along the upper portion 230. In one embodiment along with the plurality of drive wheels 130 disposed along the upper portion 230 of the body 110, additional wheels, which may or may not provide drive, are disposed on the lower portion 240 of the body 110. The combination of drive wheels maintain an orientation of the assembly against the hoistway rail 150. In one embodiment a guide implement 250 is disposed on the lower portion 240 of the body 110 to maintain an orientation of the assembly against the hoistway rail 150. In one embodiment the guide implement 250 is disposed in the upper portion 230 of the body 110 and the plurality of drive wheels at 130 are disposed in the lower portion 240. the body 110.

The guide implement 250 includes an alignment-biasing member 255 that urges, i.e., pulls, the lower portion 240 of the body toward the hoistway rail 150a. The lower portion 240 of the body 110 is pulled toward the hoistway rail 150a by, for example, an action of gravity and a lever action resulting from the action of the alignment-biasing member 255 and the lower magnet 260. The alignment-biasing member 255 may be a magnet 260, alternately referred to as one or more magnets, supported on the body 110 to maintain the orientation of the assembly 100 against the hoistway rail 150. The magnet 260 may be a permanent magnet with a low-friction coating. In one embodiment the magnet 260 is one of a plurality of magnets 265, including another magnet 265a, and a further magnet 265b that are height-wise spaced from one another along the assembly 100. In one embodiment the other magnet 265a is the only magnet. The other magnet 265a may be positioned in the upper portion 230 of the body 110, for example proximate the plurality of drive wheels 130. In such embodiment the magnet 260 and the other magnet 265a, together, pull the body 110 toward the hoistway rail 150. The magnet 260 and the other magnet 265a may be connected to one another by a magnet carrier 266 (FIG. 2). The further magnet 265b is stationary at the one end 190 of the body 110, which may be the top end. The further magnet 265b may be supported by a bracket 289 so as to be level with the sensors 120 and oppose the moment force pulling the assembly 120 off the rail 150, e.g., due to weight of the assembly 120 and sensors 120. The configuration of the magnet 260 and the other magnets 265a, 265b may otherwise be the same so that reference to the magnet 260 herein is equally applicable to the other magnets 265a, 265b.

The magnet carrier 266 may be movable by a carrier actuator 267 (FIG. 2) toward and away from the hoistway rail 150. That is, the hoistway rail 150 extends vertically and the magnet 260 may be moved horizontally by the magnet carrier 266. Moving the magnet 260 toward the hoistway rail 150 increases the biasing force MF that that urges the body 110 toward the hoistway rail 150. The one or more sensors 120 have a weight which results in a payload moment PM that tends to pry the assembly 100 from the hoistway rail 150. The magnet 260 induces a magnet moment MM that is utilized to counterbalance the payload moment PM. In another embodiment the pinch load of the plurality of drive wheels 130 may be sufficient to counteract forces and moments generated from the payload that tend to pry the assembly 100 off the hoistway rail 150. In additional embodiments a vacuum based suction force may be utilized to counteract forces and moments generated from the payload that tend to pry the assembly 100 off the hoistway rail 150.

The guide implement 250 includes a guide wheel 270. The guide wheel 270 is supported by the body 110 proximate the magnet 260. When the assembly 100 is disposed against the hoistway rail 150, the guide wheel 270 rolls against the hoistway rail 150. This maintain an orientation of the assembly against the hoistway rail. In one embodiment a plurality of the guide wheels 270 are heightwise spaced on the assembly 100. In one embodiment ones of the plurality of guide wheels 270 are proximate to respective ones of the plurality of magnets 265.

The guide implement 250 includes one or more guide slides and more specifically a plurality of guide slides 300 (shown in FIG. 3) supported in the body 110. The plurality of guide slides 300 are configured to slide against respective ones of the plurality of side surfaces 140 of the hoistway rail 150. As indicated, additional rolling elements such as additional wheels may be utilized in place of the guide slides 300. Due to the relatively low speed range of the assembly 100 in certain utilizations, the guide slides 300 may be relatively less expensive and therefore a suitable option over additional rolling elements.

The body 110 includes a plurality of guide-slide tracks 310. The plurality of guide slides 300 are configured to synchronously move along respective ones of the plurality of guide-slide tracks 310. The plurality of guide-slide tracks 310 are shaped so that movement of the plurality of guide slides 300 therein positions the plurality of guide slides 300 closer to or further from one another. From this configuration the plurality of guide slides 300 are configured for being positioned against different sizes of hoistway rails, for example, in different elevator systems (not illustrated). The plurality of guide-slide tracks 310 are curve shaped, though any other shape may be utilized. Positioning of the plurality of guide slides 300 along the plurality of guide-slide tracks 310 is controlled by, for example, an adjustable screw such as a set screw, or a spring or any other desired means.

Figure 4:
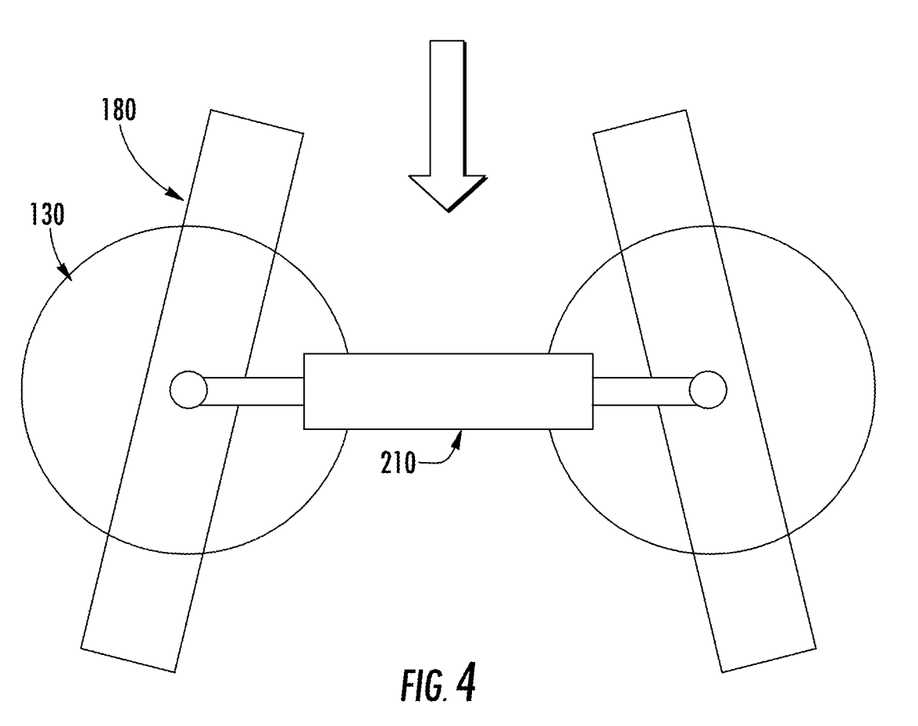
FIG. 4 shows drive-wheel tracks and a drive-wheel actuator of the inspection assembly of FIG. 2.

In one embodiment, a configuration of one or both of the plurality of drive-wheel tracks 180 and the plurality of guide-slide tracks 310 mirror one another about an axis of symmetry 320. The axis of symmetry 320 may be located between the plurality of guide slides 300 and may extend from the one end 190 of the body 110 to the other end 200 of the body 110. In other embodiments a configuration of one or both the plurality of drive-wheel tracks 180 and the plurality of guide-slide tracks 310 is asymmetric.

The body 110 forms an L-bracket. When the assembly is positioned on the hoistway rail 150, one member 340 of the L-bracket is vertical and another member 350 of the L-bracket is horizontal. The drive-wheel tracks 180 and the guide-slide tracks 310 are formed in the one member 340. The one or more sensors 120 is mounted to the other member 350.

The wireless communications herein may involve a controller 400 by an operator or inspector. Wireless communications may utilize various known protocols, such as but not limited to Bluetooth, WiFi, etc.

Figure 5:
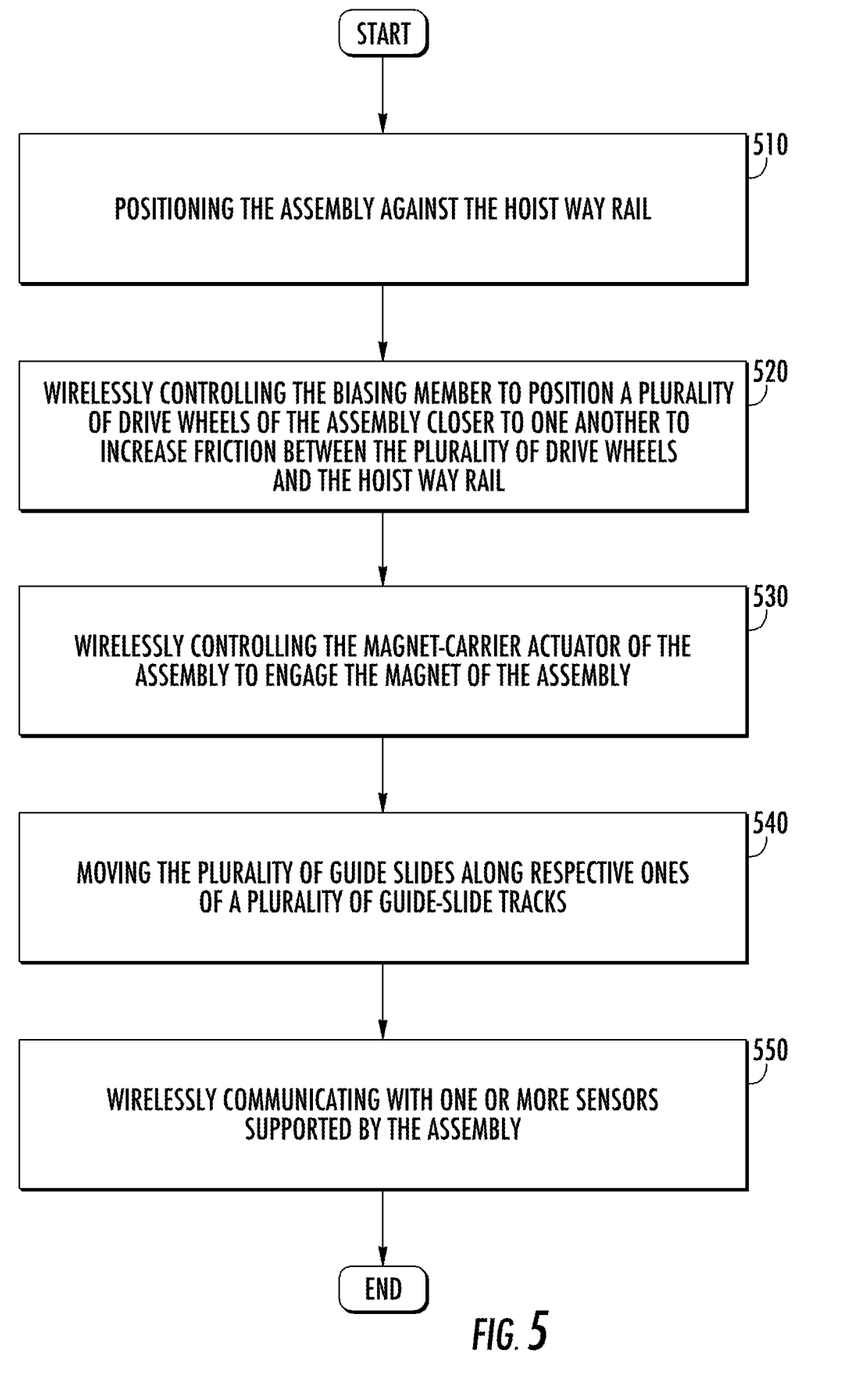
FIG. 5 is a flowchart showing a method of inspecting a hoistway rail according to an embodiment.

Turning to FIG. 5, a flowchart shows a method of inspecting the hoistway rail 150. As illustrated in block 510, the method includes positioning the assembly 100 against the hoistway rail 150. As shown in block 520 the method includes biasing the at least one drive wheel 130a of the assembly 100 closer to the hoistway rail 150. As indicated this increases friction between the at least one drive wheel 130 and the hoistway rail 150. Also as indicated, with the plurality of drive wheels 130, such basing may be from controlling the wheel biasing member 210 to move the plurality of drive wheels 130 in respective ones of the plurality of drive-wheel tracks 180 that converge toward the one end 190 of the body 110. This moves the plurality of drive-wheels 130 toward one another, as indicated. Further as indicated the wheel biasing member 210 may be controlled wirelessly or by a wired connection. Moreover as indicated in one embodiment a spring may be utilized in place of the wheel biasing member 210 so that biasing of the plurality of drive wheels 130 is automatic.

As shown in block 530 the method optionally includes moving the one or more magnet 260 toward the hoistway rail 150 for orienting the assembly 100 against the hoistway rail 150. As shown in block 540 the method optionally includes manipulating the one or more guide slides 300 for orienting the assembly 100 against the hoistway rail 150. As shown in block 550 the method optionally includes communicating with one or more sensors 120 supported by the assembly 100. As shown in block 560 the method optionally includes driving the at least one drive wheel 130 to move the assembly 100 along the hoistway rail 150.

The above disclosed assembly 100 includes an unobstructed top member of the body which allows flexibility for mounting a variety of devices and sensors and an unobstructed camera viewing angles. A control hub, e.g., the controller 400, mounted to the assembly 100 may contain a plurality of ports to allow for control of additional servos and sensors including a 360-degree camera control. The microphone array and accelerometers may be used to further assess hoistway conditions related to sounds and vibrations for troubleshooting.

The assembly 100 may be driven up the rail 150 via the two opposing wheels 130 driven for example by electric motors. Normal force between the wheels 130 and rail 150 surface is provided via springs and/or the actuating device, which may be a linear device. This provides a required amount of friction to move the assembly 100 under maximum payload. The axles for the wheels 130 may be mounted on the angled tracks which allow frictional drive force to increase proportionally with the weight of the payload.

Two challenges for an assembly climbing a single vertical rail 150 may include a moment force attempting to pull the assembly away from the surface of the rail and a force of gravity pulling downwards on the assembly. The moment force may be counteracted so that the assembly 100 is prevented from running off the rail 150 during load, while avoiding an application of excessive friction and minimizing drive train inefficiencies. Gravity may be counteracted to allow the assembly 100 to climb the rail 150 and also to ensure a stopped position can be secured on the rail 150 without consuming power. In view of these challenges, the disclosed assembly 100 includes the magnet 260, which is a sliding traction magnet.

The magnet 260 may be a permanent or electromagnet, covered with a thin low-friction material. A position of the magnet 260 is optionally controlled via the magnet actuator or manually, which may be by a linear actuator, which may allow for the positioning of the magnet 260 in relation to the rail 150 extending in a rail-depth direction. The movement varies the strength of the magnet force to the rail, which varies the moment force required to counteract the payload while minimizing the friction of the guide wheels 270, which may be considered alignment rollers. When engaged to the rail, the magnet 260 allows the assembly 100 to park against the rail 150 without consuming power. When positioned directly against the hoistway rail 150, the magnet 260 may function as a parking brake for the assembly 100. That is the assembly 100 may remain in a stationary spot on the rail 150 without requiring further effort or energy drain by the assembly 100.

To ensure proper functioning of the disclosed assembly 100, the assembly 100 is configured to remain aligned with the rail 150 during operation. Alignment in a rail-thickness direction is achieved using adjustable guides slides 300 which may be covered with low-friction material. The guide slides 300 may be adjusted to accommodate multiple rail slides and adjust the clearance. Alignment in the rail-depth direction is achieved via the previously identified magnet 260 in addition to guide wheel 270. The guide wheel 270 serves to reduce frictional loses by preventing unintentional direct contact between the magnet 260 and rail surface.

The disclosed assembly 100 is self-contained and wirelessly controlled. The assembly 100 in one embodiment is capable of climbing an elevator rail 150 without the use of power cables, ropes or a counterbalance. The disclosed assembly 100 is preferably non-destructive to a rail face. The disclosed assembly 100 is preferably capable of holding position on rail face with little or no power consumption utilizing a parking brake. The disclosed assembly 100 preferably maintains a central alignment on the rail 150 throughout a complete travel distance. The disclosed assembly 100 is preferably adjustable to multiple rail sizes.

With the disclosed assembly 100, a normal force applied to the rail 150 preferably dynamically increases, to increase drive friction, in relation to payload. That is, the disclosed assembly 100 is configured to optimize a useful life of the plurality of drive wheels 130. The pinch load or the clamp load required on the plurality of drive wheels 130 is function of the total weight supported by the assembly 100, including the weight of the assembly 100 and pay load of the sensors and other carried equipment. A greater pinch or clamp load by the plurality of drive wheels 130 will result in a shorter useful life for the plurality of drive wheels 130. Accordingly, by dynamically adjusting the clamp load as a function of the payload, the useful life of the plurality of drive wheels 130 is beneficially increased. In one embodiment an actuator force is adjusted based on load generated by the assembly 100.

With the disclosed assembly 100, installation to a rail 150 may preferably be accomplished without the use of tools. For example, a single operator, without assistance or tools, may complete an installation of the assembly 100 with the payload supported by the assembly 110.

The disclosed rail climbing inspection assembly 100 may be attached to a single elevator rail 150. The assembly 100 may preferably be remotely piloted to allow for inspection of the hoistway while allowing the operator to remain safely outside the hoistway. The assembly 100 may be used to carry a payload of sensors including, but not limited to cameras, 3D scanners, audio monitoring equipment, and vibration monitoring equipment. The assembly 100 may preferably be quickly adjusted to accommodate all different rail sizes.

The disclosed assembly 100 eliminates the need for an operator to ride on top of the elevator or stay in a hoistway pit for conducting a physical inspection. The operator can preferably quickly, without tools, attach the assembly 100 to the hoistway rail 150 and perform an inspection from outside the hoistway. During an emergency situation, the assembly 100 may enable quick assessment of hoistway conditions, for example, prior to and during a rescue attempt.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An assembly comprising:
   at least one drive wheel configured to roll against a hoistway rail of an elevator system;
   a drive mechanism supported by the assembly and configured to drive the at least one of drive wheel,
   wherein the assembly is configured to support one or more sensors; and
   wherein the at least one drive wheel comprises a plurality of drive wheels configured to roll against respective ones of a plurality of side surfaces of the hoistway rail; and
   wherein a wheel biasing member biases the plurality of drive wheels toward one another to provide a pinch load against the hoistway rail when positioned against the hoistway rail.

2. The assembly of claim 1, wherein the wheel biasing member is a spring or an actuator.

3. The assembly of claim 1, including a plurality of drive-wheel tracks that converge toward one end of the assembly, and the plurality of drive wheels move toward the one end of the assembly in the plurality of drive-wheel tracks responsive to the wheel biasing member biasing the drive wheels toward one another, thereby increasing pressure against the hoistway rail.

4. The assembly of claim 1, comprising a guide implement configured to maintain an orientation of the assembly along the hoistway rail.

5. The assembly of claim 4, wherein the guide implement includes an alignment-biasing member configured to apply a biasing force that urges the assembly toward the hoistway rail, thereby maintaining the orientation of the assembly against the hoistway rail.

6. The assembly of claim 5, wherein the alignment-biasing member implement includes one or more magnets configured to apply a biasing force that urges the assembly toward the hoistway rail, thereby maintaining the orientation of the assembly against the hoistway rail.

7. The assembly of claim 6, wherein the one or more magnets are a plurality of magnets spaced along a height of the assembly.

8. The assembly of claim 7, including a magnet carrier that is movable by an actuator to move the plurality of magnets.

9. The assembly of claim 6, wherein the guide implement includes one or more guide wheels configured to roll against the hoistway rail when the assembly is disposed against the hoistway rail.

10. The assembly of claim 4, wherein the guide implement includes one or more guide slides that are configured to slide against the hoistway rail.

11. The assembly of claim 10, wherein the one or more guide slides includes a plurality of guide slides that are configured to slide against respective ones of the plurality of side surfaces of the hoistway rail.

12. The assembly of claim 11, wherein the assembly includes a plurality of guide-slide tracks, and the plurality of guide slides are configured to move along respective ones of the plurality of guide-slide tracks, thereby positioning the plurality of guide slides closer to or further from one another.

13. The assembly of claim 1, wherein the one or more sensors includes one or more of a cameras, 3D scanners, audio monitoring equipment, and vibration monitoring equipment.

14. The assembly of claim 1, wherein:

the assembly includes a body that defines an L-bracket; and when the assembly is positioned on the hoistway rail:
the one end of the body is a vertical top of the body and the other end of the body is a vertical bottom of the body;
one member of the L-bracket is vertical, and another member of the L-bracket is horizontal; and
the one or more of drive-wheels are rotationally connected to the one member and the one or more sensors is mounted to the other member.

15. An elevator system including a hoistway rail and the assembly of claim 1, the assembly being disposed against the hoistway rail.

16. A method of inspecting a hoistway rail, comprising:
positioning an assembly against the hoistway rail;
biasing at least one drive wheel against the hoistway rail to increase friction between the least one drive wheel and the hoistway rail;
driving the at least one drive wheel to move the assembly along the hoistway rail; and
communicating with one or more sensors supported by the assembly;
wherein the at least one drive wheel comprises a plurality of drive wheels configured to roll against respective ones of a plurality of side surfaces of the hoistway rail; and
wherein a wheel biasing member biases the plurality of drive wheels toward one another to provide a pinch load against the hoistway rail when positioned against the hoistway rail.

17. The method of claim 16, including moving one or more magnets of a guide implement toward the hoistway rail for orienting the assembly against the hoistway rail.

18. The method of claim 16, including manipulating one or more guide slides of the guide implement for orienting the assembly against the hoistway rail.

* * * * *